United States Patent [19]
McLaughlin

[11] Patent Number: 6,125,566
[45] Date of Patent: Oct. 3, 2000

[54] PICTURE FRAME FOR MOUNTING A PICTURE FROM AN AUTOMOBILE DASHBOARD

[76] Inventor: Ronald McLaughlin, 3774 59th St. N., St. Petersburg, Fla. 33710

[21] Appl. No.: 09/347,784

[22] Filed: Jul. 6, 1999

Related U.S. Application Data

[63] Continuation-in-part of application No. 09/096,396, Jun. 11, 1998.

[51] Int. Cl.[7] .................................................. A47G 1/06
[52] U.S. Cl. .......................... 40/737; 40/757; 40/593; 40/749
[58] Field of Search .......................... 40/757, 737, 749, 40/761, 591, 593; 248/688, 470, 126

[56] References Cited

U.S. PATENT DOCUMENTS

| | | | |
|---|---|---|---|
| 366,715 | 1/1887 | Damlos | 248/470 |
| 1,289,130 | 12/1918 | Duncan | 248/470 |
| 5,259,579 | 11/1993 | Schneider | 248/470 |
| 5,388,353 | 2/1995 | Givnan | 40/737 |
| 5,489,055 | 2/1996 | Levy | 224/544 |
| 5,639,052 | 6/1997 | Sauve | 248/311.2 |
| 5,727,696 | 3/1998 | Valiulis | 211/51 |

FOREIGN PATENT DOCUMENTS 125339  4/1919  United Kingdom ......... 40/FOR 152.1

*Primary Examiner*—Cassandra H. Davis
*Attorney, Agent, or Firm*—Dennis G. LaPointe; Mason & Assoc., P.A.

[57] ABSTRACT

A picture frame and method for mounting on a dashboard of an automobile comprising a transparent picture holder with a pivotable U-shaped supporting member on the backside of the holder with bent ends at the distal ends of the U-shaped supporting member, the bent distal ends being detachably secured to vertical grill portions of a ventilation grill assembly or to a closed ash tray compartment or to a closed glove box compartment of an automobile dashboard.

6 Claims, 5 Drawing Sheets

PICTURE FRAME FOR MOUNTING A PICTURE FROM AN AUTOMOBILE DASHBOARD

RELATED APPLICATION

This application is a continuation-in-part of U.S. patent application Ser. No. 09/096,396 filed Jun. 11, 1998.

BACKGROUND OF THE INVENTION

1. Field of the invention

The invention relates to a picture frame for mounting a picture from an automobile dashboard ventilation grill assembly, ash tray compartment, or glove box compartment and method of hanging the picture frame from said automobile dashboard.

2. Description of related art

Picture frame holders are generally known in the art. For example, U.S. Pat. No. 366,715 to Damlos is a picture frame which incorporates a wire support. However, picture frames holders for mounting on a dashboard of an automobile are not generally known in the art. Most considerations are instead given to developing cup holders for use in an automobile as depicted in U.S. Pat. No. 5,639,052 to Sauve, U.S. Pat. No. 5,489,055 to Levy and U.S. Pat. No. 5,259,579 to Schneider.

Therefore, it is an object of the present invention to provide a simple and novel picture frame holder for displaying a picture and for mounting the picture from a ventilation grill assembly, a closed ash tray compartment, or a closed glove box compartment of an automobile dashboard. It is anticipated that travelers away from home will have fond memories of loved ones pictorially displayed in the traveler's automobile. An object of the present invention is to provide a means of satisfying this need to remember loved ones while traveling in an automobile away from home.

SUMMARY OF THE INVENTION

The present invention provides a transparent picture holder with supporting member that can be used in various locations within the interior of an automobile; particularly, on a dashboard so that the pictured display can be viewed by the occupants of an automobile. The picture frame for mounting on a dashboard includes a transparent picture holder and a U-shaped supporting member pivotally attached to the backside of the holder. The U-shaped support member has a bent portion at the distal end of each leg of the U-shaped support member. The picture holder is generally made of polymeric or plastic material such as acrylic and is formed by first and second parallel flat portions between which a picture is sandwiched. The two parallel portions are integrally joined along a bottom edge to prevent the picture from falling out. The picture is inserted between the parallel flat portions through a slot at the top or on the sides formed by the two parallel portions. The picture holder further includes a third parallel flat portion extending a predetermined distance from an integrally connected top edge of the second and third parallel flat portions.

The U-shaped support member has an intermediate segment, that is, the bottom of the U-shape support member, which is pivotally attached on the backside of the picture holder at a level within the upper halve of the flat portion, preferably juxtaposed to the top edge, and within the inside joint formed by the integrally connected second and third flat portions of the picture holder. This arrangement allows the picture to hang in a substantially upright position within the automobile. The simple design allows for convenient relocation to alternate positions to suit the need of the driver or passenger.

The distal ends of the U-shaped support member is squeezed sufficiently to pass the ends through a ventilation grill assembly and released to engage with the vertical grill portion of the ventilation grill assembly. Alternative locations on a dashboard of an automobile from which to hang a picture include an ash tray compartment or a glove box compartment, wherein distal ends of the support member detachably engage the ash tray compartment when the cover of the ash tray is closed or the glove box compartment when the door of the glove box compartment is closed.

Accordingly, it is a principal object of the invention to provide a versatile picture frame which may be used within an automobile that is inexpensive, easy to use, and that provides fond memories to occupants of an automobile by displaying memorable pictures.

These and other important objects, features and advantages of the invention will become readily apparent as this description proceeds.

The invention accordingly comprises the features of construction, combination of elements and arrangements of parts that will be exemplified in the construction hereinafter set forth, and the scope of the invention will be indicated in the claims.

DETAILED DESCRIPTION OF THE INVENTION

Figure 1:
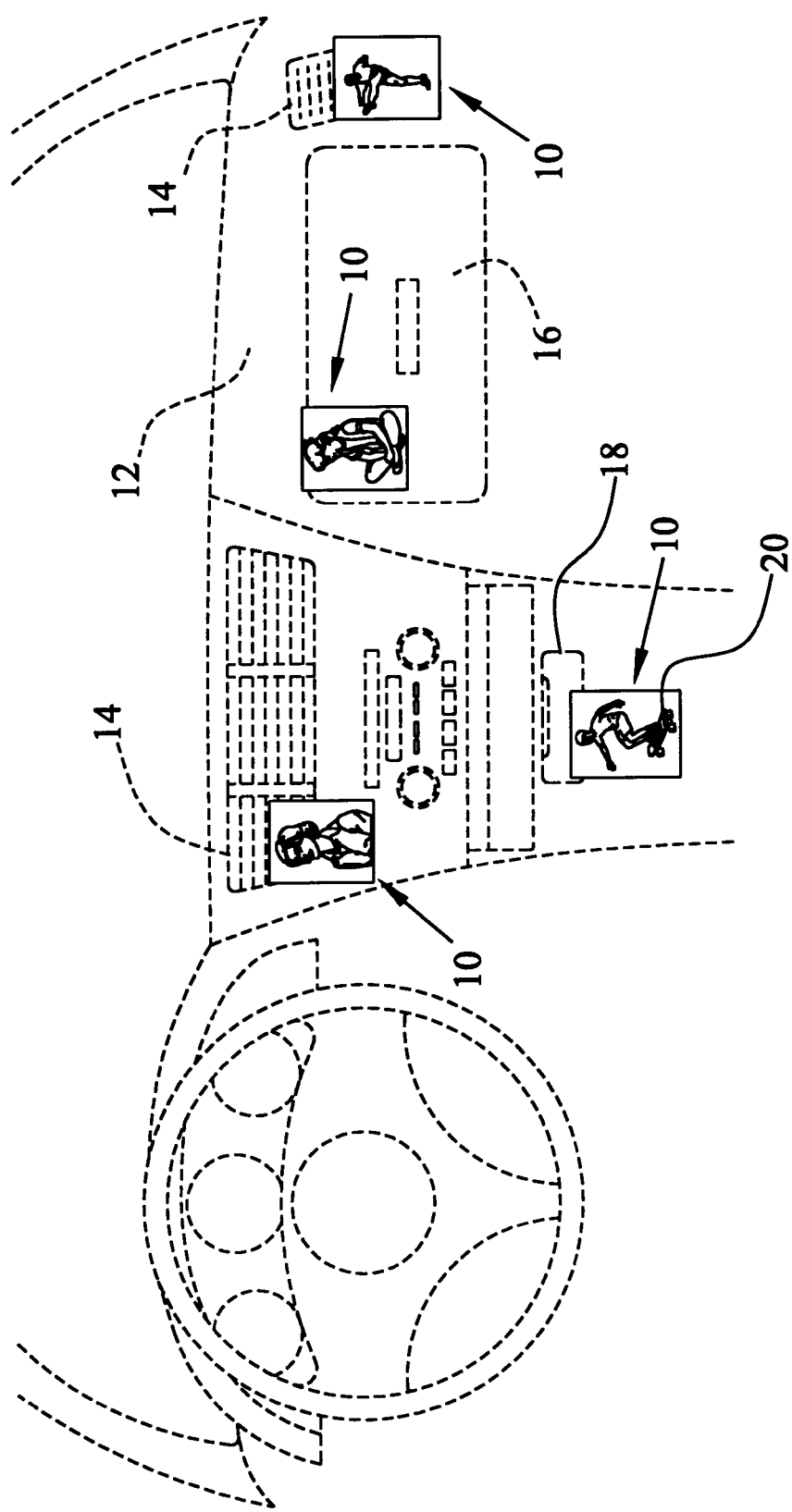
FIG. 1 is a perspective view of an automobile dashboard showing the present invention secured to a ventilation grill assembly, an ash tray compartment and a glove box compartment.

Referring to FIG. 1, picture frame 10 is depicted hanging from various locations on a dashboard 12 of an automobile. Preferred locations from which to hang picture frame 10 include a ventilation grill assembly 14, an ash tray compartment 44 or a glove box compartment 16.

Figure 2:
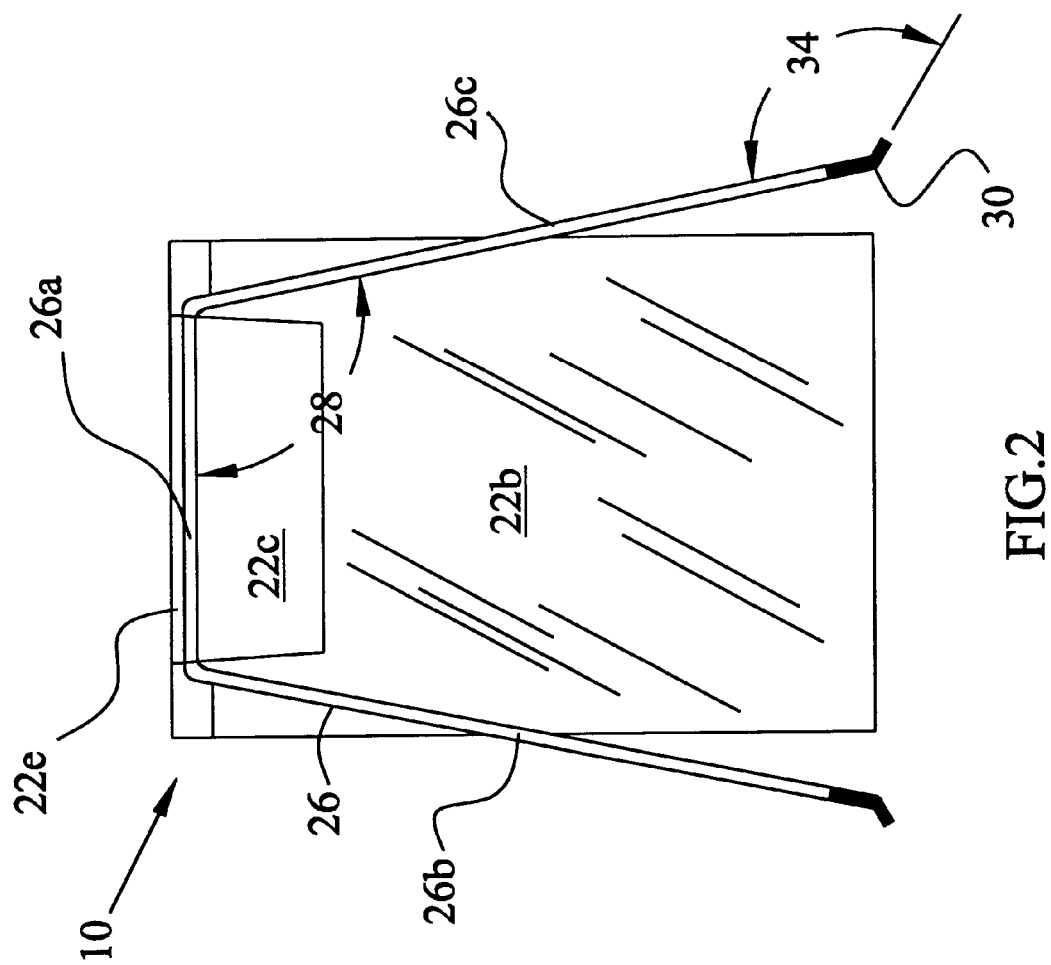
FIG. 2 is a rear perspective view of the present invention.
Figure 3:
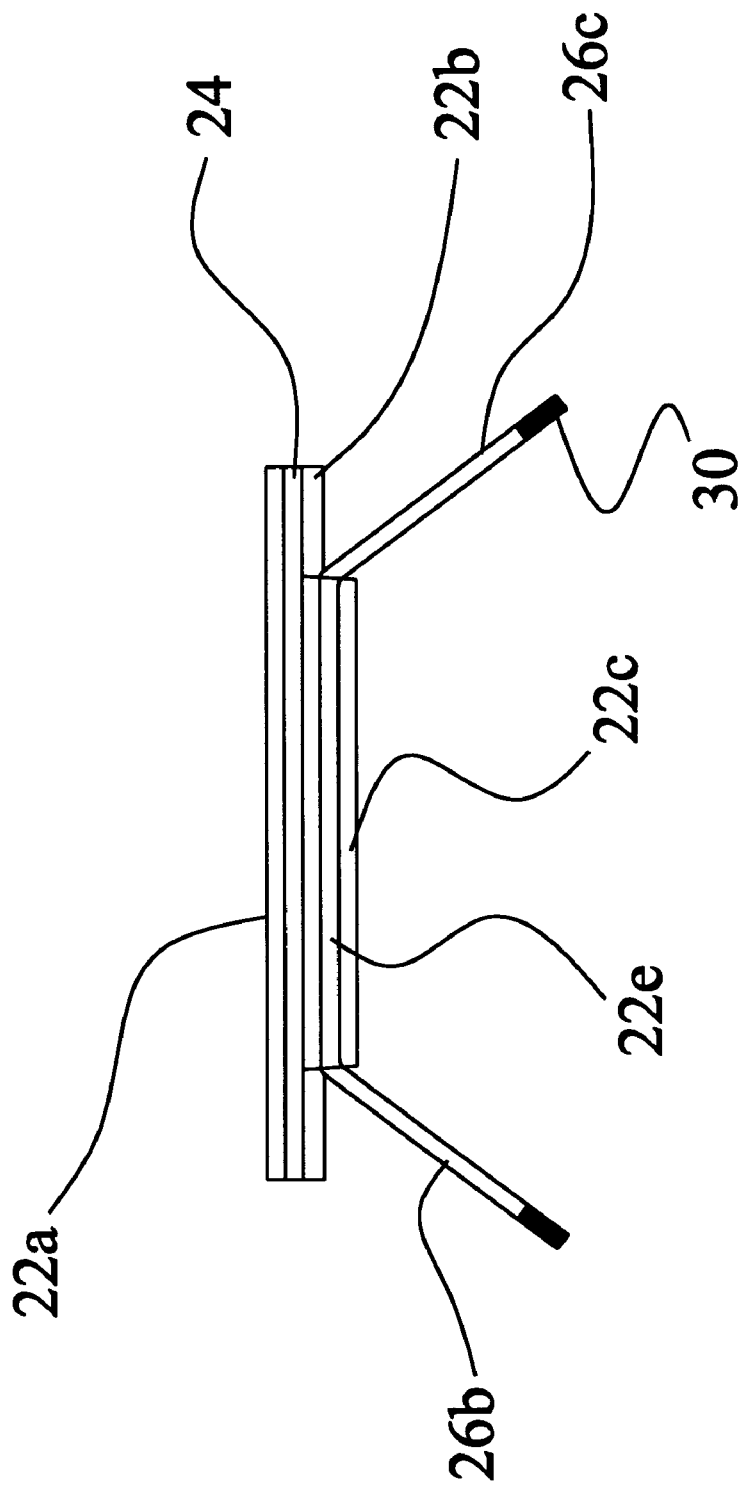
FIG. 3 is a plan perspective view of the present invention.
Figure 4:
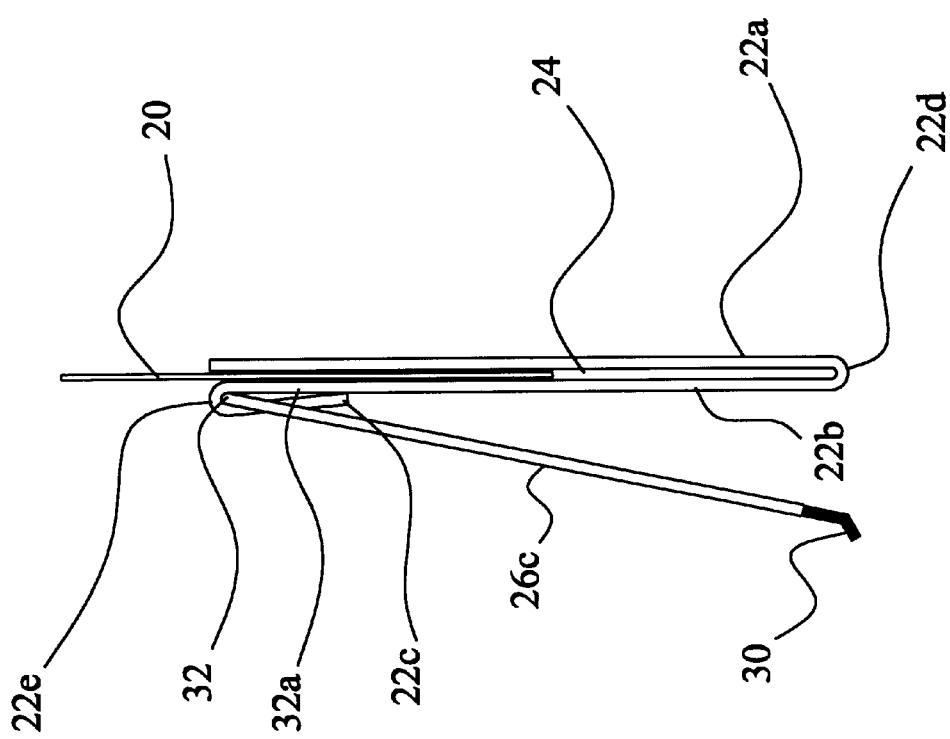
FIG. 4 is a side perspective view of the present invention.

Referring to FIGS. 2–4, the picture frame for mounting on an automobile dashboard 12 comprises a transparent polymeric picture holder 22 having a flat first portion 22a parallel to a flat second portion 22b, the portions being integrally connected along a bottom edge 22d of the holder 22. The transparent polymeric picture holder 22 further includes a flat third portion 22c parallel to the flat second portion 22b which extends a predetermined distance from an integrally connected top edge 22e of each of the flat second and third portions, 22b and 22c respectively.

Further included is a slot 24 formed between the flat parallel first portion 22a and second portion 22b of the polymeric picture holder 22 for receiving a picture 20 to be displayed. A U-shaped support member 26, wherein the U-shaped support member 26 includes an intermediate segment 26a and a first and second segment, 26b and 26c respectively, the first and second segments being integrally joined at approximately a 60° to 135° angle, reference numeral 28, to each end of the intermediate segment 26a, each first and second segment further having a distal end 30. The invention further includes means 32 for pivotally attaching the intermediate segment 26a of the U-shaped support member 26 to a backside of the transparent polymeric picture holder 22, wherein an inside joint 32a of the integrally connected flat second and third portions, 22b and 22c respectively, is formed to snuggly receive the intermediate segment 26a of the U-shaped support member 26 while maintaining the intermediate segment 26a parallel to the bottom edge 22d of the picture holder 22 such that the center of gravity of the picture holder 22 with the attached U-shaped support member 26 maintains the slot 24 for inserting the picture 20 oriented above the bottom edge 2d when said picture holder 22 is hung from a predetermined location on a dashboard 12 of an automobile. Means 32 for detachably securing the U-shaped support member 26 from the predetermined location on the dashboard 12 of an automobile are also included, the preferred means 32 further including the U-shaped support member 26 wherein the distal ends 30 of the first and second segments, 26b and 26c respectively, of the U-shaped support member 26 are bent at approximately 60° to 135°, reference numeral 34, in a direction proximately aligned with the intermediate segment 26a and generally directed opposite each other.

It is recommended that the picture holder 22 be made from a polymeric material such as an acrylic plastic material. Although transparent colored tinted acrylic is acceptable, clear acrylic is preferred in order to have a clearer view of the picture 20 being displayed. In addition, non-glare acrylic improves the visual display of the picture 20. A recommended practical application of the making of the picture holder 22 is to form the holder 22 with an approximate 0.0625 inch thick acrylic material.

The U-shaped support member 26 can be made of from a polymeric material, although a preferred practical application would make the support member from a wire to provide additional durability, such as a hard type 300 series stainless steel or 26 gauge music wire. It is recommended that the wire be approximately 0.063 inch diameter wire that meets ASTM Standards A228 and 580. The distal ends of the wire may be plastic coated to minimize the chance of scratching a user with the ends of the wire.

Figure 5:
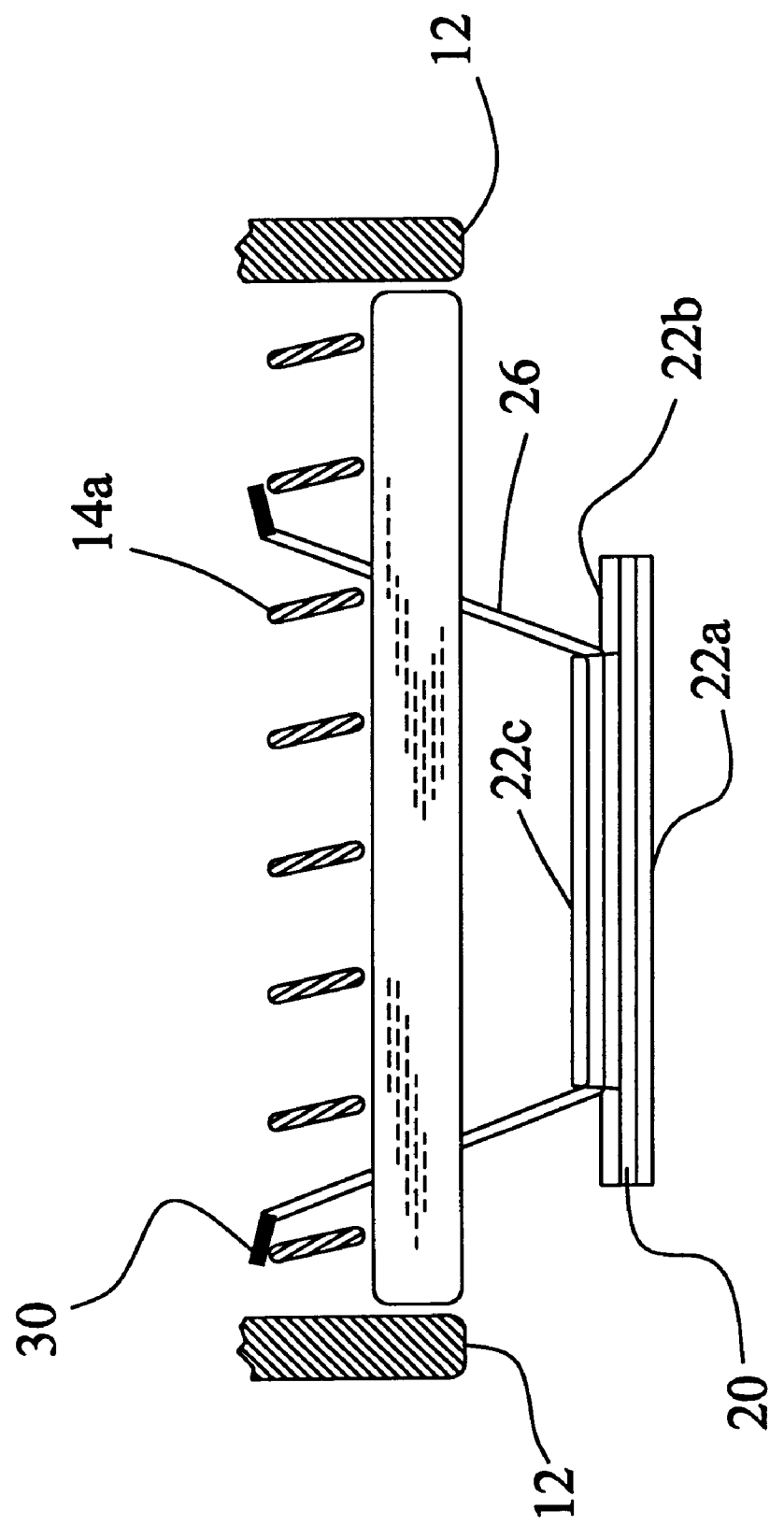
FIG. 5 is a perspective view of the present invention hanging from the vertical grill portion of a ventilation grill assembly on a dashboard of an automobile, the vertical grill portion being behind the horizontal grill portion.

FIG. 5 depicts the picture frame 10 mounted to a dashboard's ventilation grill assembly 14. In most vehicles, the horizontal portions of the ventilation grill assembly is located in front of the grill assembly and the present invention is mounted by slightly squeezing the distal ends 30 of the U-shaped support member 26, inserting the ends through the horizontal grill, and releasing the distal ends 30 so that they engage the vertical grill portion 14a of the ventilation grill assembly 14.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also understood that the following claims are intended to cover all of the generic and specific features of the invention herein described, and all statements of the scope of the invention which, as a matter of language, might be said to fall therebetween.

Now that the invention has been described.

What is claimed is:

1. A picture frame for mounting a picture from an automobile dashboard ventilation grill assembly, ash tray compartment, and glove box compartment, the picture frame comprising:

a transparent polymeric picture holder having a flat first portion parallel to a flat second portion, the portions being integrally connected along a bottom edge of said holder;

the transparent polymeric picture holder further including a flat third portion parallel to the flat second portion and extending a predetermined distance from an integrally connected top edge of each of the flat second and third portions;

a slot between the parallel first and second portions of said polymeric picture holder for receiving a picture to be displayed;

a U-shaped support member, wherein the U-shaped support member includes an intermediate segment and a first and second segment, the first and second segments being integrally joined at approximately a 60° to 135° angle to each end of the intermediate segment, each first and second segment further having a distal end;

means for pivotally attaching the intermediate segment of the U-shaped support member to a backside of the transparent polymeric picture holder, wherein an inside joint of the integrally connected flat second and third portions is formed to snuggly receive the intermediate segment of the U-shaped support member while maintaining the intermediate segment parallel to the bottom edge of the picture holder such that the center of gravity of the picture holder with the attached U-shaped support member maintains the slot for inserting the picture oriented above the bottom edge when said picture holder is hung from a predetermined location on a dashboard of an automobile; and means for detachably securing the U-shaped support member from the predetermined location on the dashboard of an automobile.

2. The picture frame according to claim 1, wherein the means for detachably securing the U-shaped support member from the predetermined location on the dashboard of an automobile comprises the U-shaped support member including the intermediate segment and the first and second segments, each having distal ends, wherein the distal ends of the first and second segments of the U-shaped support member are bent at approximately 60° to 135° in a direction proximately aligned with the intermediate segment and generally directed opposite each other.

3. The picture frame according to claim 2, wherein the U-shaped support member is made of polymeric material.

4. The picture frame according to claim 2, wherein the U-shaped support member is a wire.

5. A method for mounting a picture from a dashboard ventilation grill assembly of an automobile comprising the steps of:

inserting a picture in a slot opening of a transparent polymeric picture holder having a flat first portion parallel to a flat second portion, the portions being integrally connected along a bottom edge of said holder and the portions thereby sandwiching the picture between said portions, the transparent polymeric picture holder further including a flat third portion parallel to the flat second portion and extending a predetermined distance from an integrally connected top edge of each of the flat second and third portions;

pivotally attaching an intermediate segment of a U-shaped support member to a backside of the transparent polymeric picture holder, wherein an inside joint of the integrally connected flat second and third portions is formed to snuggly receive the intermediate segment of the U-shaped support member while maintaining the intermediate segment parallel to the bottom edge of the picture holder, the U-shaped support member further including a first and second segment, the first and second segments being integrally joined at approximately a 60° to 135° angle to each end of the intermediate segment, each first and second segments further having a distal end wherein the distal ends are bent at approximately 60° to 135° in a direction proximately aligned with the intermediate segment and generally directed opposite each other;

squeezing the distal ends of the U-shaped support member; and inserting said distal ends in a ventilation grill assembly of an automobile dashboard such that the bent distal ends detachably engage vertical grill portions within the ventilation grill assembly when the squeezed distal ends are released.

6. A method for mounting a picture from a dashboard ash tray compartment or a glove box compartment of an automobile comprising the steps of:

inserting a picture in a slot opening of a transparent polymeric picture holder, the picture holder having a flat first portion parallel to a flat second portion, the portions being integrally connected along a bottom edge of said holder and the portions thereby sandwiching the picture between said portions, the transparent polymeric picture holder further including a flat third portion parallel to the flat second portion and extending a predetermined distance from an integrally connected top edge of each of the flat second and third portions;

pivotally attaching an intermediate segment of a U-shaped support member to a backside of the transparent polymeric picture holder, wherein an inside joint of the integrally connected flat second and third portions is adapted to snuggly receive the intermediate segment of the U-shaped support member while maintaining the intermediate segment parallel to the bottom edge of the picture holder, the U-shaped support member further including a first and second segment, the first and second segments being integrally joined at approximately a 60° to 135° angle to each end of the intermediate segment, each first and second segments further having a distal end wherein the distal ends are bent at approximately 60° to 135° in a direction proximately aligned with the intermediate segment and generally directed opposite each other; and inserting said distal ends in a dashboard ash tray compartment or a glove box compartment of an automobile such that the bent distal ends detachably engage the ash tray compartment when a cover of the ash tray compartment is closed or the glove box compartment when a door to the glove box compartment is closed.

* * * * *